(12) United States Patent
Hiramatsu et al.

(10) Patent No.: US 9,205,729 B2
(45) Date of Patent: Dec. 8, 2015

(54) SUNSHADE DEVICE (75) Inventors: Shinichi Hiramatsu, Chiryu (JP);
Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/125,421

(22) PCT Filed: Jun. 14, 2012

(86) PCT No.: PCT/JP2012/065252
§ 371 (c)(1),
(2), (4) Date: Dec. 11, 2013

(87) PCT Pub. No.: WO2012/173191
PCT Pub. Date: Dec. 20, 2012

(65) Prior Publication Data
US 2014/0117724 A1 May 1, 2014

(30) Foreign Application Priority Data

Jun. 15, 2011 (JP) ................................ 2011-133216
May 9, 2012 (JP) ................................ 2012-107855

(51) Int. Cl.
*B60J 3/02* (2006.01)
*B60J 7/06* (2006.01)
*B60R 13/02* (2006.01)
*B60J 7/00* (2006.01)

(52) U.S. Cl.
CPC ................ *B60J 7/067* (2013.01); *B60J 7/0015* (2013.01); *B60R 13/0231* (2013.01)

(58) Field of Classification Search
CPC .......... B60J 7/067; B60J 7/0015; B60J 7/003; B60R 13/0231
USPC .................................................. 296/214, 217
See application file for complete search history.

(56) References Cited

U.S. PATENT DOCUMENTS

| 3,797,553 | A |   | 3/1974 | Elliott |
| 4,220,189 | A |   | 9/1980 | Marquez |
| 4,376,543 | A | * | 3/1983 | Sakagami ..................... 277/345 |
| 4,649,981 | A |   | 3/1987 | Bibeau |
| 4,717,200 | A | * | 1/1988 | Kruger ......................... 296/214 |

(Continued)

FOREIGN PATENT DOCUMENTS

| JP | 58-49775 | 3/1983 |
| JP | 59-102866 | 7/1984 |

(Continued)

OTHER PUBLICATIONS

Office Action for Japanese Appl. No. 2011-133216 dated May 12, 2015.

*Primary Examiner* — Dennis H Pedder
(74) *Attorney, Agent, or Firm* — Finnegan, Henderson, Farabow, Garrett & Dunner, LLP (57) ABSTRACT

A sunshade device is provided with a shading sheet adapted to shade light incident through an opening formed in the vehicle to an interior of a passenger compartment or to permit the passage of the light. The shading sheet moves along a pair of guide rails having guide passages, which slidably support both ends of the shading sheet in the lateral direction of the vehicle. The sunshade device is provided with shielding members extending in the longitudinal direction of the guide rails and shielding the guide passages from the interior of the passenger compartment.

9 Claims, 9 Drawing Sheets

(56) References Cited

U.S. PATENT DOCUMENTS

| | | | |
|---|---|---|---|
| 4,869,548 A * | 9/1989 | Nagata et al. | 296/221 |
| 6,145,911 A * | 11/2000 | Sturt et al. | 296/65.01 |
| 6,386,626 B1 * | 5/2002 | Makino et al. | 296/214 |
| 6,454,346 B1 * | 9/2002 | Nabuurs | 296/216.06 |
| 6,533,349 B2 * | 3/2003 | Nabuurs | 296/216.08 |
| 6,547,320 B2 * | 4/2003 | Kohout et al. | 296/223 |
| 6,957,850 B2 | 10/2005 | Breuer et al. | |
| 7,793,702 B2 * | 9/2010 | Biewer et al. | 160/370.22 |
| 2001/0030452 A1 * | 10/2001 | Karami et al. | 296/216.01 |
| 2005/0073175 A1 * | 4/2005 | Breuer et al. | 296/214 |
| 2006/0027347 A1 | 2/2006 | Boehm et al. | |
| 2009/0145559 A1 | 6/2009 | Glasl et al. | |
| 2011/0227372 A1 | 9/2011 | Hirata et al. | |

FOREIGN PATENT DOCUMENTS

| | | |
|---|---|---|
| JP | 62-144714 | 9/1987 |
| JP | 63-151516 | 6/1988 |
| JP | 2-246824 | 10/1990 |
| JP | 10-100686 | 4/1998 |
| JP | 2004-256090 | 9/2004 |
| JP | 2005-186893 | 7/2005 |
| JP | 2008-520859 | 6/2008 |
| JP | 2009-12584 | 1/2009 |
| JP | 2011-79449 | 4/2011 |

* cited by examiner

SUNSHADE DEVICE

CROSS-REFERENCE TO RELATED APPLICATIONS

This application is a national phase application of International Application No. PCT/JP2012/065252, filed Jun. 14, 2012, and claims the priority of Japanese Patent Application Nos. 2011-133216, filed Jun. 15, 2011, and 2012-107855, filed May 9, 2012, the contents of all of which are incorporated herein by reference.

FIELD OF THE INVENTION

The present invention relates to a sunshade device, which shades light incident through an opening formed in a vehicle to the passenger compartment and permits the passage of the light.

BACKGROUND OF THE INVENTION

A transparent fixed panel or movable panel is provided in the opening formed in a roof of a vehicle. A sunshade device including a shading sheet, which shades light incident through the opening to the passenger compartment and permits the passage of the light, is provided in the opening. For example, refer to Patent Document 1.

In the sunshade device disclosed in Patent Document 1, the shading sheet is rolled up by rolling-up force of a built-in spring. A beam is provided in an end of the shading sheet opposite to the direction in which the shading sheet is rolled up. The beam slides on guide rails so that the shading sheet shades the light incident to the passenger compartment, and permits the passage of the light. The movement of the beam stopped when frictional force with the guide rails exceeds the rolling-up force of the spring.

PRIOR ART DOCUMENT

Patent Document

Patent Document 1: Japanese Laid-Open Patent Publication No. 2004-256090

SUMMARY OF THE INVENTION

In the above described sunshade device, however, a sliding portion of each guide rail on which the beam slides may be seen from the interior of the passenger compartment in the state where the shading sheet is open. The view of the body of the guide rail and the sliding portion, which do not need to be seen, decreases appearance. Accordingly, a sunshade device with an excellent appearance has been needed.

An object of the present invention is to provide a sunshade device with an excellent appearance.

In order to achieve the above described object, a sunshade device including a shading sheet, a pair of guide rails including guide passages, and shielding members each provided in one of the guide rails is provided. The shading sheet is adapted to shade light incident through an opening formed in a vehicle to an interior of a passenger compartment and permit passage of the light. The guide passages slidably support opposite end portions of the shading sheet in a lateral direction. Each shielding member extends in a longitudinal direction of the corresponding guide rail and shields the guide passage from the interior of the passenger compartment.

DETAILED DESCRIPTION OF THE PREFERRED EMBODIMENTS

First Embodiment

Hereinafter, a sunshade device according to one embodiment of the present invention will be described with reference to FIGS. 1 to 6.

Figure 1:
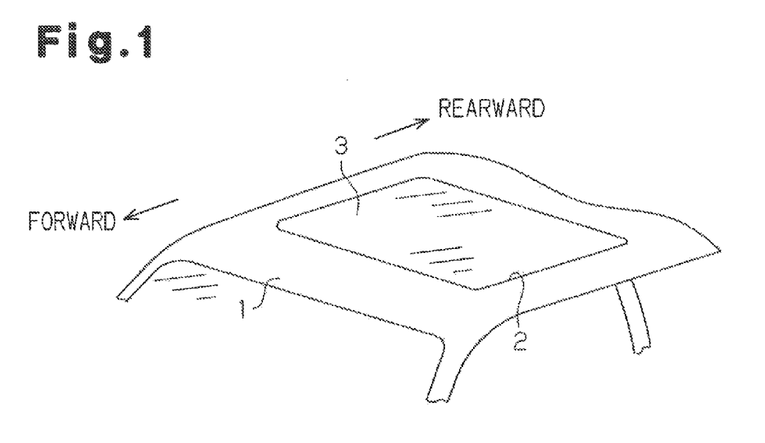
FIG. 1 is a perspective view illustrating a roof of a vehicle.

As shown in FIG. 1, a substantially rectangular roof opening 2 is formed in a roof 1 of a vehicle. A roof panel 3, which permits passage of light such as sunlight, is installed in the roof opening 2. A sunshade device 10, which shades light such as sunlight incident through the roof panel 3, is provided in a part of a passenger compartment corresponding to the roof opening 2. The roof panel 3 corresponds to a movable panel.

Figure 2:
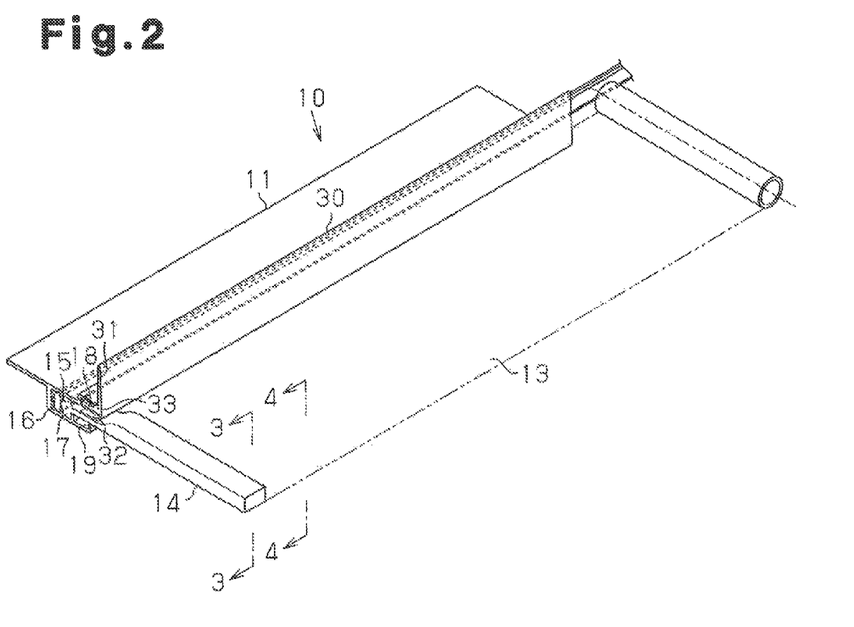
FIG. 2 is a perspective view illustrating a sunshade device when shading light.
Figure 3:
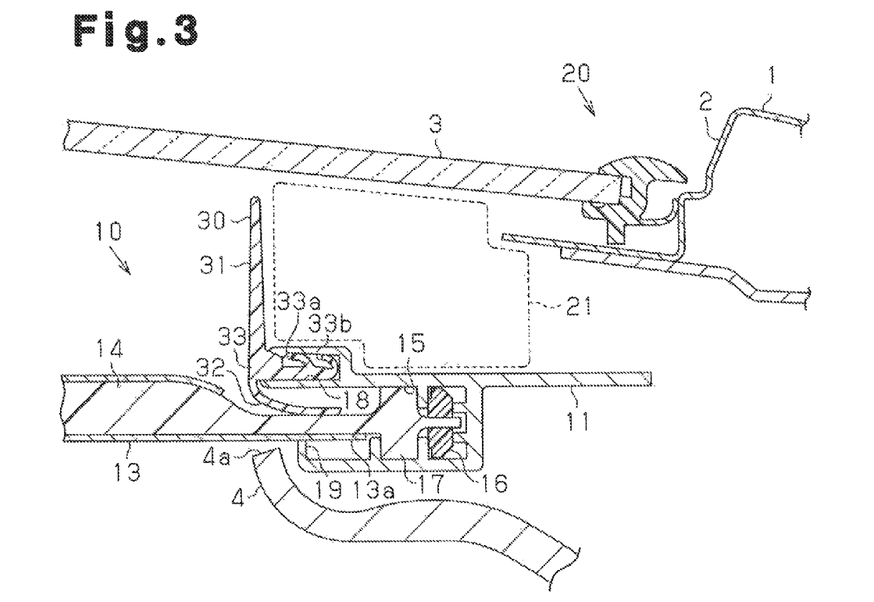
FIG. 3 is a cross-sectional view taken along line 3-3 of FIG. 2.

As shown in FIGS. 2 and 3, in the roof 1, a pair of guide rails 11, which extend in the longitudinal direction of the vehicle, are provided at opposite edges of the roof opening 2 in the lateral direction of the vehicle. The sunshade device 10 includes a shading sheet 13, which is adapted to be moved in the longitudinal direction of the guide rails 11 in the longitudinal direction of the vehicle so that the shading sheet 13 shades the light incident through the roof panel 3. That is the sunshade device 10 permits the light to be incident through the passenger compartment by rolling up the shading sheet 13 about an axis that extends in the lateral direction of the vehicle in a rear end of the roof opening 2 of the vehicle. Also, the sunshade device 10 shades the light incident to the interior of the passenger compartment by expanding the shading sheet 13 from the rear end of the roof opening 2 of the vehicle to the front end of the roof opening 2.

The shading sheet 13 has a substantially cuboid frame 14 connected to an end of the shading sheet 13 to be a leading end when rolling out the shading sheet 13, namely a front end of the shading sheet 13. The frame 14 is suspended between the guide rails 11 and guided by the guide rails 11 when moving the shading sheet 13. Each guide rail 11 has a guide passage 15, which slidably supports corresponding one of opposite ends of the shading sheet 13 in the lateral direction of the vehicle. That is, the frame 14 has a pair of ends (ends in the lateral direction of the vehicle) slidably supported by the corresponding guide passages 15. A sliding portion 17 is provided on each end of the frame 14 in the lateral direction of the vehicle. Each sliding portion 17 slides on an upper surface of a bottom wall and a lower surface of an upper wall in the guide passage 15 of each guide rail 11 when driven by a driving portion 16 provided in each guide rail 11. The front end of the shading sheet 13 of the vehicle is stuck on an inner bottom surface of the frame 14 in the passenger compartment. The frame 14 corresponds to a beam.

Further, a roof device 20, which opens and closes the roof opening 2 by moving the roof panel 3 in the longitudinal direction of the vehicle, is provided in the roof 1. In the roof device 20, a driving portion 21, which drives the roof panel 3 in the longitudinal direction of the vehicle, is installed on an upper portion of each guide rail 11 of the sunshade device 10. The details of the driving portion 21 of the roof device 20 are omitted. The roof device 20 corresponds to a driving device.

Figure 4:
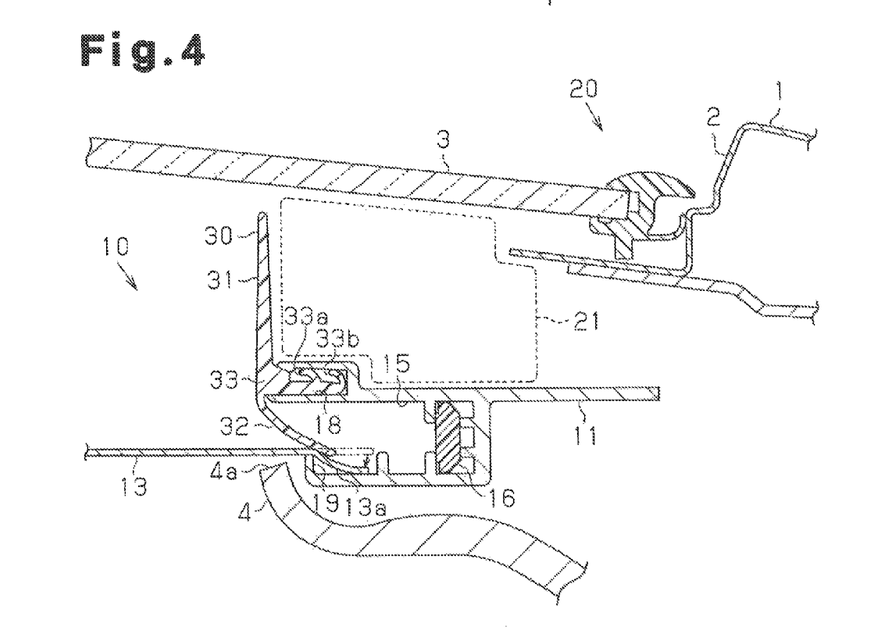
FIG. 4 is a cross-sectional view taken along line 4-4 of FIG. 2.

As shown in FIGS. 2 to 4, a decorative member 30, which shields the interior of each guide rail 11 and the driving portion 21 of the roof device 20, is provided in the sunshade device 10 of the present embodiment. A mounting recess 18, which is substantially U-shaped in a cross-sectional view, is formed in the upper portion of each guide rail 11 inward, in the lateral direction, of the vehicle. A mounting portion 33, which fits into the mounting recess 18 and protrudes in the lateral direction of the vehicle, is formed in the decorative member 30. Two rows of retaining protrusions 33a and 33b, which restrict the mounting portion 33 from coming off the mounting recess 18, are formed on the upper surface of the mounting portion 33. The retaining protrusions 33a and 33b serve as retainers, which contact the upper surface of the inner wall of the mounting recess 18 and incline inward in the lateral direction of the vehicle when the mounting portion 33 fits into the mounting recess 18, and contact the upper surface of the inner wall of the mounting recess 18 when the decorative member 30 is drawn in the direction in which the mounting portion 33 is drawn out of the mounting recess 18.

A decorative portion 31, which extends along each guide rail 11 and protrudes immediately in front of the roof panel 3 to shield the driving portion 21 of the roof device 20, is formed integrally with the mounting portion 33 on the upper portion of the mounting portion 33 of the decorative member 30. The decorative portion 31 of the decorative member 30 shields a mechanism positioned on the upper portion of the guide rail 11 from the interior of the passenger compartment.

Also, a shielding portion 32, which extends along each guide rail 11 and protrudes inward of the guide rail 11 to shield the driving portion 15 of the guide rail 11, is formed integrally with the mounting portion 33 on the lower portion of the mounting portion 33 of the decorative member 30. The shielding portion 32 extends in the longitudinal direction of the guide rail 11. The shielding portion 32 of the decorative member 30 is formed such that it extends downward opposite to the decorative portion 31. The shielding portion 32 contacts the upper surface of the frame 14 or the shading sheet 13 so that the shielding portion 32 is located inside the guide passage 15. The shielding portion 32 of the decorative member 30 shields the interior of the guide rail 11 from the interior of the passenger compartment. The shielding portion 32 serves as a shielding member.

A support portion 19 is formed in the lower portion of the guide rail 11 inward in the lateral direction of the vehicle. The support portion 19 contacts an end portion 13a of the shading sheet 13 and the lower portion of the frame 14 and supports the end portion 13a and the frame 14. The support portion 19 is formed such that it protrudes upward.

As shown in FIG. 3, the shielding portion 32 of the decorative member 30 contacts the upper surface of the frame 14 from above at a part in which the frame 14 is positioned in the guide rail 11. Accordingly, the interior of the guide rail 11 is shielded by the frame 14 and the shielding portion 32 from the interior of the passenger compartment.

As shown in FIG. 4, the end portion 13a of the shading sheet 13 contacts the support portion 19, and the shielding portion 32 of the decorative member 30 contacts the end portion 13a from above at a part in which the shading sheet 13 is positioned in the guide rail 11. That is, the end portion 13a of the shading sheet 13 is pressed by the support portion 19 and the shielding portion 32. Accordingly, oscillation of the shading sheet 13 due to external force such as vehicle vibration is limited, and generation of unnecessary collision sound is limited as well because the shading sheet 13 no longer interferes with an in-vehicle ceiling 4. Further, since the floating of the shading sheet 13 is limited, the entry of the light though a gap generated between the shading sheet 13 and the guide rail 11, or a gap between the shading sheet 13 and the in-vehicle ceiling 4 is limited. The in-vehicle ceiling 4 corresponds to a passenger compartment interior decorative member.

In the state where the shielding portion 32 does not contact the end portion 13a of the shading sheet 13, the end portion 13a of the shading sheet 13 is brought into a state where it extends in a horizontal direction as shown by a broken line in which a long dash alternates with a pair of short dashes. According to the present embodiment, when the shielding portion 32 contacts the end portion 13a of the shading sheet 13, the end portion 13a of the shading sheet 13 is brought into a state shown by a solid line. Accordingly, the shading sheet 13 is brought into a state where it is tensed in the lateral direction of the vehicle. The interior of the guide rail 11 is shielded by the shading sheet 13 and the shielding portion 32 from the interior of the passenger compartment.

Figure 5:
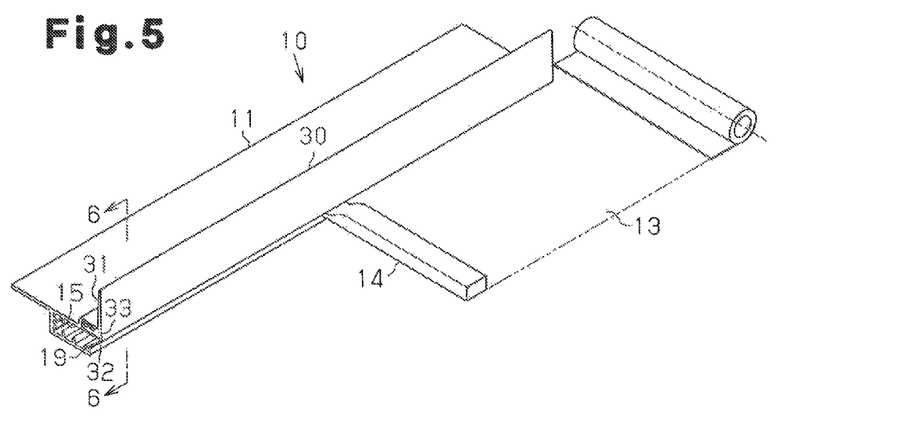
FIG. 5 is a perspective view illustrating the sunshade device when the device is open.
Figure 6:
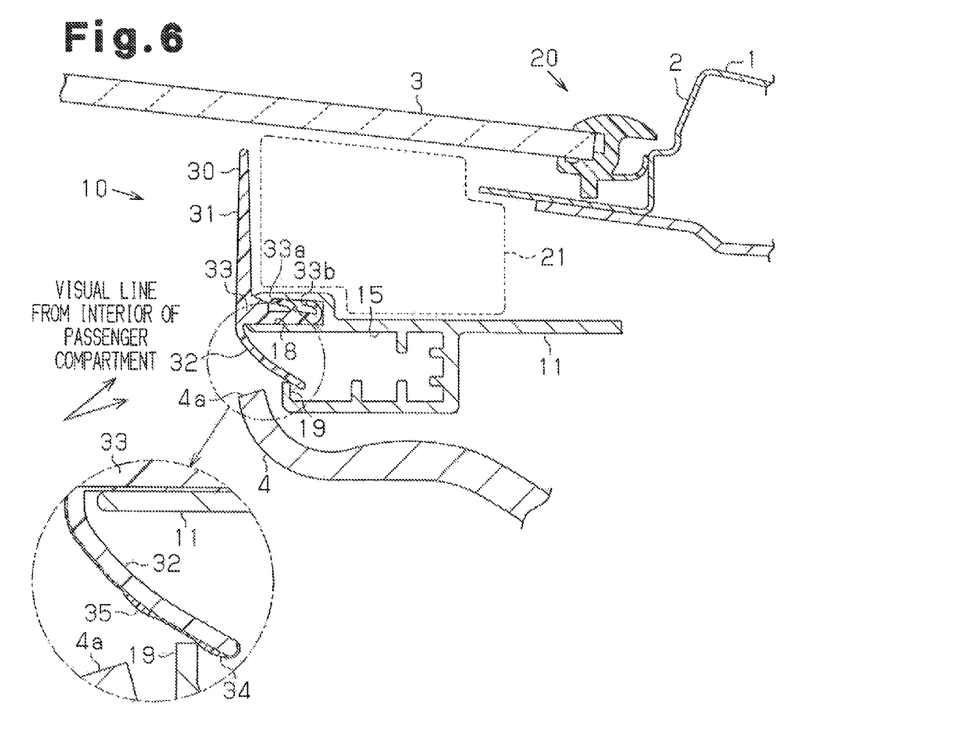
FIG. 6 is a cross-sectional view taken along line 6-6 of FIG. 5 with an enlarged view illustrating a distal end of a shielding member.

As shown in FIGS. 5 and 6, the shielding portion 32 of the decorative member 30 is located inside the guide passage 15 and contacts the support portion 19 at a part in which the shading sheet 13 is absent in the guide rail 11. Accordingly, the interior of the guide rail 11 is shielded by the shielding portion 32 from the interior of the passenger compartment.

As shown in the enlarged view of FIG. 6, the shielding portion 32 is elastic, and formed of a material with comparatively low hardness. Also, the surface of the shielding portion 32 facing the shading sheet 13 has low sliding resistance, and is formed of a material with comparatively high hardness. That is, the shielding portion 32 is formed by two-color molding. A first contact portion 34 in the surface of the shielding portion 32, which contacts the support portion 19, is shaped as a protrusion in a cross-sectional view. Further, in addition to the first contact portion 34 in which the shielding portion 32 and the frame 14 contact, a second contact portion 35 is shaped as a protrusion in a cross-sectional view. Since the surface of the shielding portion 32 is formed of the material with low sliding resistance, and the contact portions 34 and 35 of the shielding portion 32 are shaped as protrusions, the shielding portion 32 smoothly slides on the shading sheet 13 and the frame 14 when the shielding portion 32 contacts the shading sheet 13 and the frame 14.

Since the sunshade device 10 of the present embodiment includes the decorative member 30, the driving portion 21 of the roof device 20 and the driving portion 16 of the sunshade device 10 are shielded from the interior of the passenger compartment. More specifically, the decorative portion 31 of the decorative member 30 protrudes toward the roof panel 3 so that the decorative portion 31 shields the driving portion 21 of the roof device 20. The distal end of the shielding portion 32 of the decorative member 30 is located inside the guide passage 15 and contacts the support portion 19 so that the interior of the guide rail 11 is shielded from the interior of the passenger compartment.

The first embodiment has the following advantages.

(1) The shielding portion 32 of the decorative member 30 provided in the guide rail 11 extends along the guide rail 11 and shields the interior of the guide rail 11 from the interior of the passenger compartment. Accordingly, even in the state where the shading sheet 13 is opened and no longer present in the guide rail 11, the sliding portion of the guide rail 11 on which the frame 14 of the shading sheet 13 slides is invisible from the interior of the passenger compartment so that the appearance viewed from the interior of the passenger compartment is improved.

(2) The shielding portion 32 of the decorative member 30 contacts the end portion 13a of the shading sheet 13 in the lateral direction, and the guide rail 11 contacts the end portion 13a of the shading sheet 13 in the lateral direction. Thereby, the shielding portion 32 and the guide rail 11 cooperate to press the end portion 13a of the shading sheet 13 in the lateral direction. Accordingly, in the state where the shading sheet 13 shields the interior of the passenger compartment, the oscillation of the end portion 13a of the shading sheet 13 in the lateral direction due to the external force such as the vehicle vibration is limited. Further, the oscillation of the shading sheet 13 is limited so that the shading sheet 13 is restricted from being interfered with the in-vehicle ceiling 4. Accordingly, the generation of unnecessary collision sound is limited. Moreover, since the floating of the shading sheet 13 is limited, the entry of the light though the gap generated between the shading sheet 13 and the guide rail 11, or the gap between the shading sheet 13 and the in-vehicle ceiling 4 into the passenger compartment is limited.

(3) The shielding portion 32 of the decorative member 30 provided in the guide rail 11 contacts the guide rail 11 so that the interior of the guide rail 11 is ensured to be shielded from the interior of the passenger compartment.

(4) The distal end of the shielding portion 32 of the decorative member 30 is located inside the guide passage 15 so that the interior of the guide rail 11 is ensured to be shielded from the interior of the passenger compartment.

(5) The contact portions 34 and 35 of the shielding portion 32 of the decorative member 30, which contact the shading sheet 13, are formed of a material with low sliding resistance. Accordingly, when the shielding portion 32 of the decorative member 30 and the shading sheet 13 contact each other according to the shielding and opening operations of the shading sheet 13, the shading sheet 13 smoothly slides.

(6) The contact portions 34 and 35 of the shielding portion 32 of the decorative member 30, which contact the shading sheet 13, are shaped as protrusions in the cross-sectional view. Accordingly, when the shielding portion 32 of the decorative member 30 and the shading sheet 13 contact each other according to the shielding and opening operations of the shading sheet 13, a contact area between the shielding portion 32 and the shading sheet 13 is reduced so that the shading sheet 13 smoothly slides.

(7) The decorative portion 31 of the decorative member 30 installed on the guide rail 11 shields the driving portion 21 of the roof device 20, which drives the roof panel 3. Accordingly, even in the state where the roof panel 3 is opened so that the roof panel 3 is no longer present over the driving portion 21 of the roof device 20, the driving portion 21 of the roof device 20 is invisible from the interior of the passenger compartment so that the appearance viewed from the interior of the passenger compartment is improved.

The above described first embodiment may be modified as follows.

Figure 7:
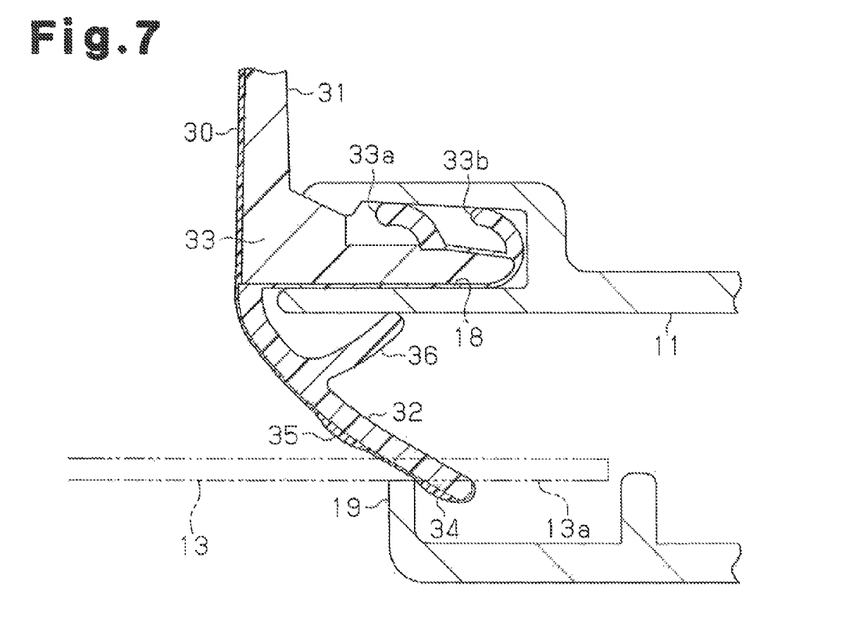
FIG. 7 is an enlarged cross-sectional view illustrating the sunshade device.

As shown in FIG. 7, a support protrusion 36, which supports the shielding portion 32, may be formed integrally with the shielding portion 32 on a surface of the shielding portion 32 facing the upper portion of the guide rail 11. The support protrusion 36 corresponds to a support portion. The support protrusion 36 is formed integrally with the shielding portion 32, and a distal end of the support protrusion 36 contacts the lower surface of the guide rail 11 so that the positional displacement of the shielding portion 32 when opening and closing the shielding portion 32 is limited. That is, the support protrusion 36, which contacts the guide rail 11, is provided on the shielding portion 32. Accordingly, in the case where the shielding portion 32 of the decorative member 30 contacts the shading sheet 13, even if the shielding portion 32 is displaced to the upper portion of the guide rail 11, the support protrusion 36 contacts the guide rail 11 to support the shielding portion 32. Therefore, the displacement of the shielding portion 32 of the decorative member 30 is limited.

Figure 8:
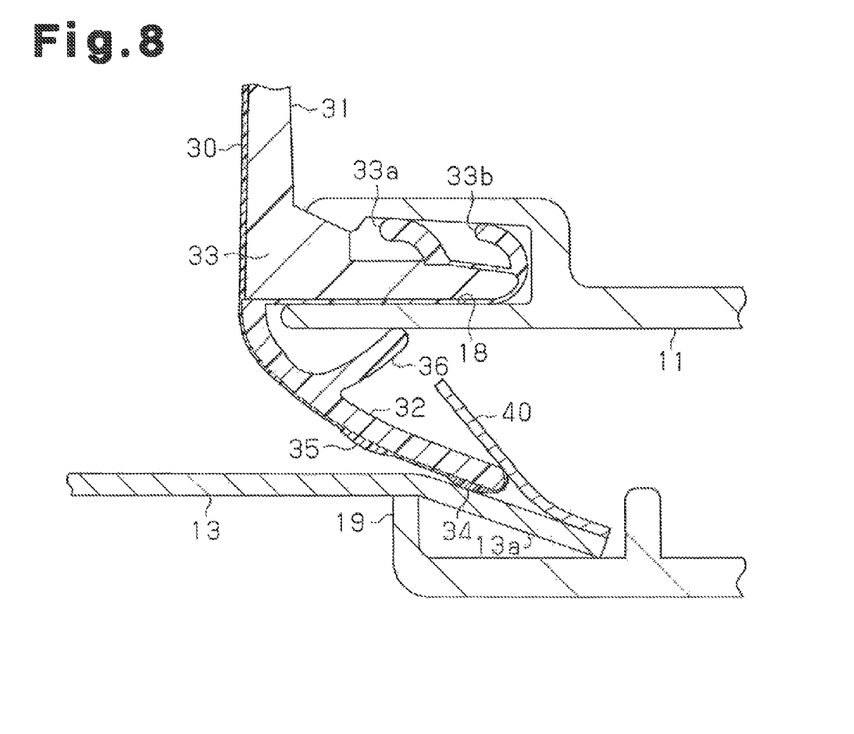
FIG. 8 is an enlarged cross-sectional view illustrating the sunshade device.

As shown in FIG. 8, a retaining sheet 40, which catches and retains the shielding portion 32 on the upper surface of the and portion 13a of the shading sheet 13, is attached or sewed on the shading sheet 13. The retaining sheet 40 serves as a retaining portion. Only one end portion of the retaining sheet 40 is attached to the shading sheet 13. The shielding portion 32 is arranged between the retaining sheet 40 and the end portion 13a of the shading sheet 13. That is, the retaining sheet 40 is provided such that the retaining sheet 40 and the and portion 13a of the shading sheet 13 in the lateral direction lie on opposite sides of the distal end of the shielding portion 32 of the decorative member 30. Accordingly, even if the shading sheet is drawn inward in the lateral direction due to the vehicle vibration, the end portion 13a of the shading sheet 13 is caught by the retaining sheet 40 so that it is retained.

In the above described first embodiment, the contact portions 34 and 35 shaped as protrusions are provided on the shielding portion 32. If it is not necessary to reduce the contact resistance, the entire surface of the shielding portion 32 may be flat.

In the above described first embodiment, the surface of the shielding portion 32 is formed of a material with low sliding resistance. The surface of the shielding portion 32 may be formed of a material with high sliding resistance. The shielding portion 32 and the surface thereof may be formed of the same material as long as the material is elastic in which the sliding resistance is reduced.

Figure 16:
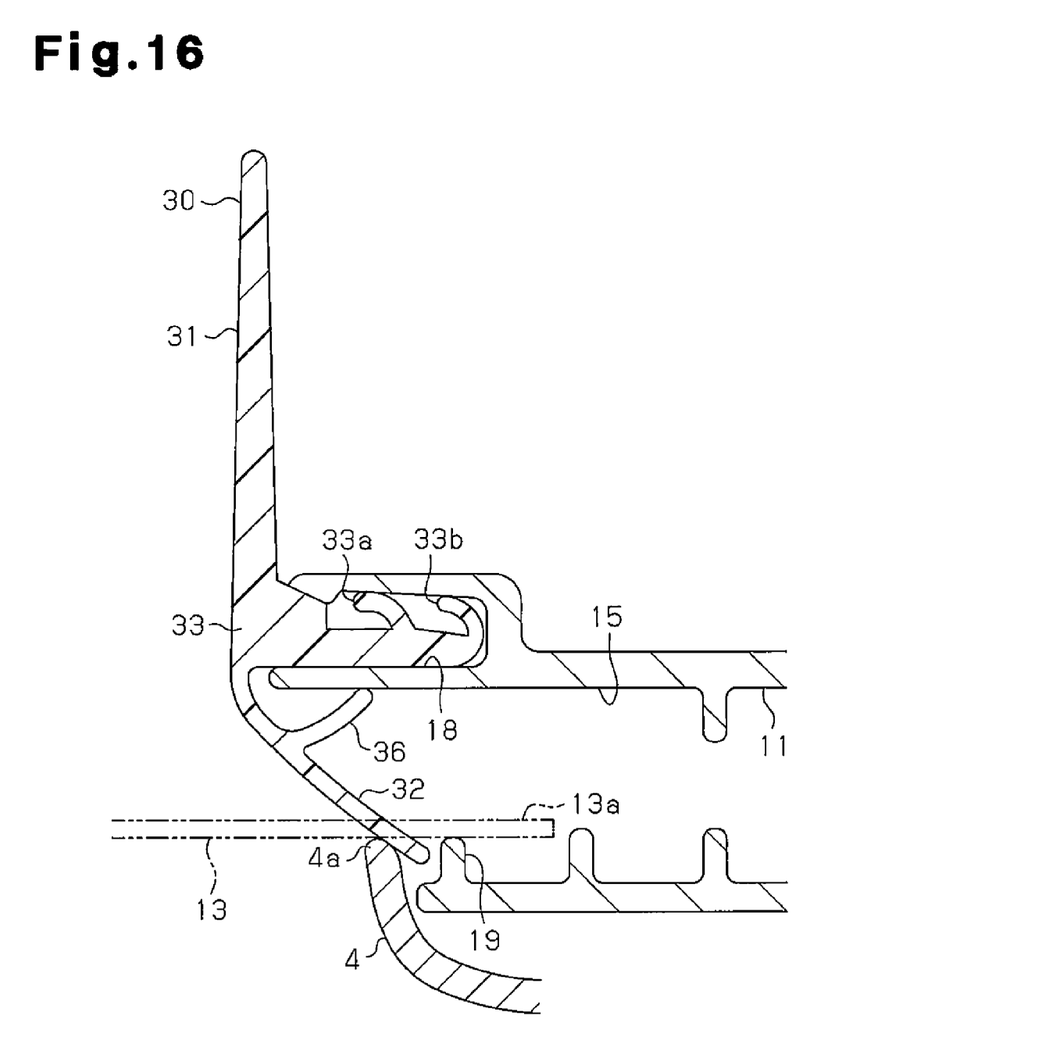
FIG. 16 is a cross-sectional view illustrating another embodiment of the sunshade device.

In the above described first embodiment, the distal end of the shielding portion 32 is located inside the guide passage 15 to contact the guide rail 11. The distal end of the shielding portion 32 may be arranged outside of the guide passage 15 as long as the guide passage 15 is shielded. More specifically, as shown in FIG. 16, the shielding portion 32 may be adapted to operate with the opening end 4a of the in-vehicle ceiling formed at a position corresponding to the roof opening 2 to contact the end portion of the shading sheet 13 in the lateral direction, and press the end portion of the shading sheet 13 in the lateral direction.

In the above described first embodiment, the shape of the frame 14 may be changed to have a shape other than the substantially cuboid shape.

In the above described first embodiment, the shading sheet 13 and the frame 14 are connected by sticking. A connecting structure according to fitting as disclosed in Japanese Laid-Open Patent Publication No. 2005-186893 may be adopted, for example.

In the above described first embodiment, the decorative portion 31, which shields the driving portion 21 of the roof device 20, is provided. A configuration in which the decorative portion 31 is omitted may be adopted.

The decorative member 30 without the decorative portion 31 may be adopted if the roof panel 3 is of a stationary type.

In the above described first embodiment, the sunshade device 10, which shades a part corresponding to the roof opening 2, is applied. The sunshade device 10, which shades a part other than the part corresponding to the roof opening 2 (for example, window glass), may be applied.

In the above described first embodiment, the phrase "shading sheet" includes not only a shading sheet, which shades 100% of the light, but also a shading sheet that changes transmittance of the light.

Second Embodiment

Figure 9:
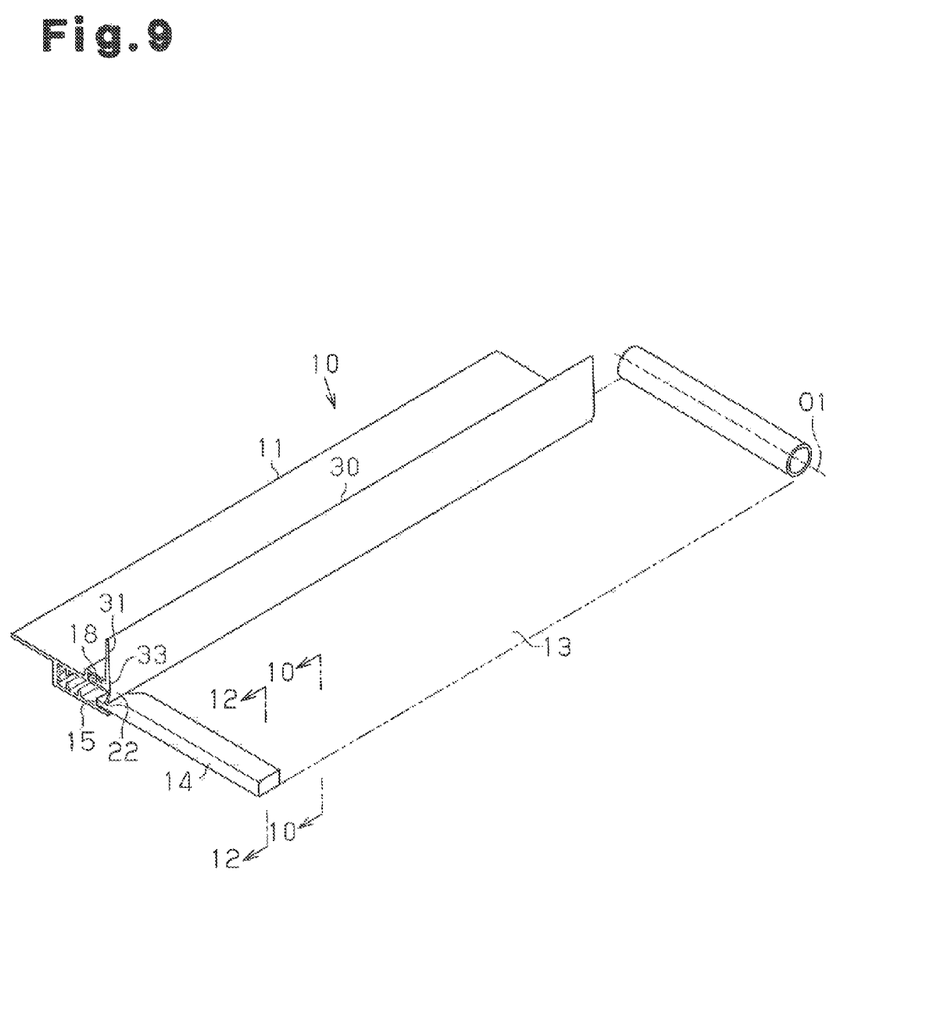
FIG. 9 is a perspective view illustrating the sunshade device when shading light.

A sunshade device according to a second embodiment of the present invention will be described with reference to FIGS. 9 to 13(c). As shown in FIG. 9, the sunshade device 10 of the second embodiment has generally the same structure as that of the first embodiment. Hereinafter, in the description of the second embodiment, only the differences from the first embodiment will be discussed. The same reference numerals are given to those components that are the same as the corresponding components of the first embodiment, and detail descriptions thereof are omitted.

In the second embodiment, a part, which guides the end portion 13a of the shading sheet 13 along each guide rail 11, is different from that of the first embodiment.

A guide portion 22 (shielding member), which extends along each guide rail 11 and protrudes inward of the guide rail 11, is formed integrally with the mounting portion 33 on the lower portion of the mounting portion 33 of the decorative member 30. The guide portion 22 of the decorative member 30 is formed to extend downward opposite to the decorative portion 31. The guide portion 22 is configured to be warped to be substantially arcuate in the cross-sectional view such that it is received in the guide passage 15. The rigidity of the guide portion 22 is set smaller than the rigidity of the guide rail 11.

In the second embodiment, the support portion 19 of the first embodiment is omitted so that the upper surface of the bottom wall of the guide passage 15 of the guide rail 11 extends horizontally. The edge portion 13a of the shading sheet 13 in the lateral direction is slidably supported by the guide passage 15 of the guide rail 11. That is, the shading sheet 13 includes a sheet covering 41 formed of a substantially rectangular cloth material, which expands to shade the light incident through the roof panel 3 according to the rolling out of the shading sheet 13, and a guide band 42 formed of a substantially hand shaped cloth material connected to each of opposite edge portions 41a of the sheet covering 41 in the lateral direction over the substantially entire length thereof.

Figure 10:
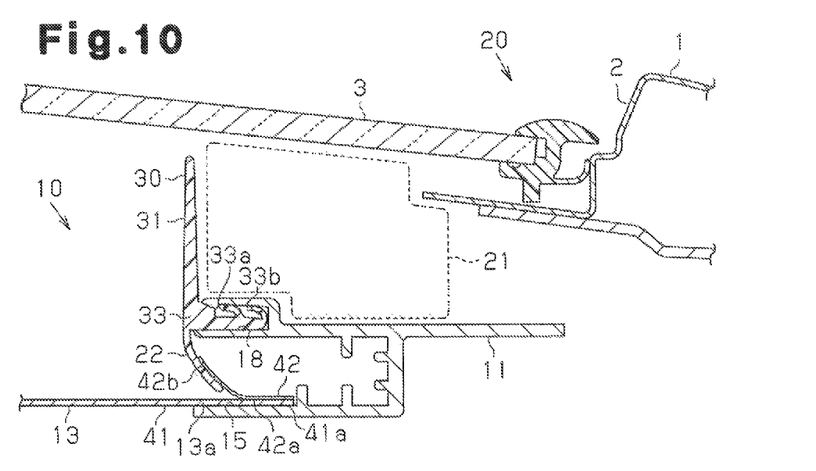
FIG. 10 is a cross-sectional view taken along line 10-10 of FIG. 9.

The sheet covering 41 is supported by the upper surface of the bottom wall of the guide passage 15 at the edge portion 41a in the lateral direction thereof. The guide band 42 is laminated on the upper surface of the sheet covering 41 at an outer edge portion 42a in the lateral direction of the vehicle so that it is connected to the upper surface, and an inner portion thereof in the lateral direction of the vehicle to be brought into a free state forms a sliding portion 42b. As for the edge portion 13a of the shading sheet 13 in the lateral direction where the sheet covering 41 and the guide band 42 lie on the opposite sides of the guide portion 22 in the interior of the guide passage 15 (guide rail 11), the edge portion 41a of the sheet covering 41 in the lateral direction slides on the bottom wall of the guide passage 15 so that the edge portion 13a is guided to slide on the guide portion 22 on the guide band 42 (sliding portion 42b). The guide portion 22 slides on and guides the guide band 42 in the state where the lower end thereof does not contact the upper surface of the sheet covering 41.

Figure 11:
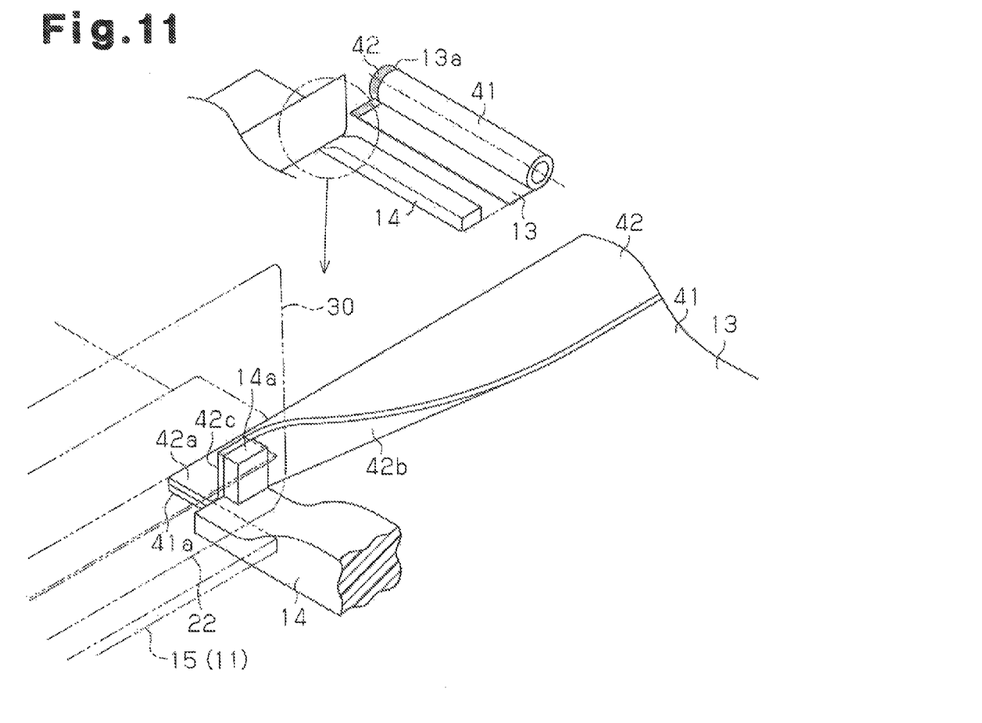
FIG. 11 is a perspective view illustrating the sunshade device when the device is open.

As shown in FIG. 11, in the state where the shading sheet 13 is rolled up, the entire guide band 42 including the sliding portion 42b is laminated on the upper surface of the sheet covering 41 so that the entire guide band 42 is rolled up integrally with the sheet covering 41. That is, the edge portion 13a of the shading sheet 13 is rolled up with a thickness including the thickness of the sheet covering 41 and the guide band 42.

Figure 12:
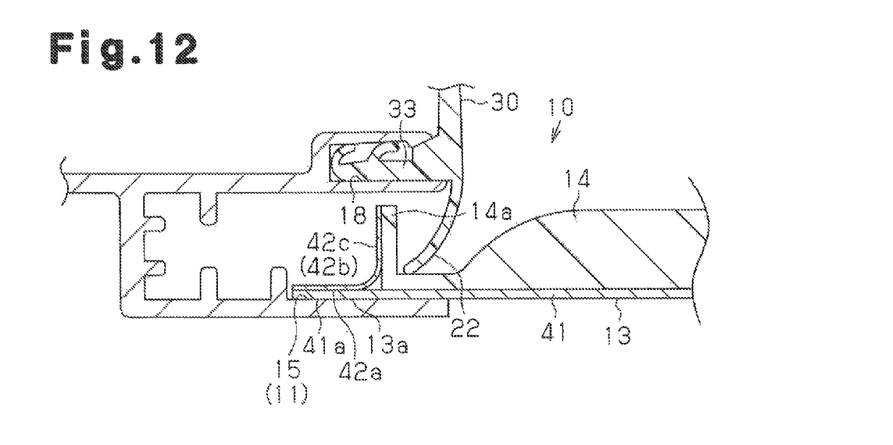
FIG. 12 is a cross-sectional view taken along line 12-12 of FIG. 9.

In contrast, the lower surface of the frame 14 is joined with a front end portion of the sheet covering 41 of the vehicle (end portion to be a leading end portion when rolling out the sheet). A vertical wall portion 14a is provided to stand on each end portion of the frame 14 in the lateral direction such that it extends upward. The outer surface of the vertical wall portion 14a in the lateral direction of the vehicle is joined with the sliding portion 42b of the guide band 42. As shown in FIGS. 11 and 12, the vertical wall portion 14a of the frame 14 is arranged more outward in the lateral direction of the vehicle than the guide portion 22 in the interior of the guide passage 15 (guide rail 11). Accordingly, the sliding portion 42b is, at least at a joining portion 42c (connecting portion) with the vertical wall portion 14a, also arranged more outward in the lateral direction of the vehicle than the guide portion 22 in the interior of the guide passage 15 (guide rail 11). That is, the lower end of the guide portion 22 contacts or is close to the vertical wall portion 14a more inward in the lateral direction of the vehicle than the vertical wall portion 14a.

Thereby, the guide band 42 (sliding portion 42b) slides with the preceding joining portion 42c according to the rolling out of the shading sheet 13 when the end portion (vertical wall portion 14a) of the frame 14 moves on the guide rail 11 forward of the vehicle. Accordingly, the guide band 42 is arranged more outward in the lateral direction of the vehicle than the guide portion 22, and slides on the guide portion 22 such that the guide band 42 and the sheet covering 41 lie on the opposite sides of the guide portion 22. In particular, as shown in FIG. 11, when the end portion (vertical wall portion 14a) of the frame 14 moves on the guide rail 11 forward of the vehicle from a rear end of the guide portion 22, namely a distal end of the shading sheet 13 in the rolling up direction thereof, the guide band 42 (sliding portion 42b) is deformed such that it gradually stands up from the state where the guide band 42 is laminated on the sheet covering 41 behind the joining portion 42c. The guide band 42 (sliding portion 42b) is arranged more outward in the lateral direction of the vehicle than the guide portion 22. That is, as the guide band 42 (sliding portion 42b) has passed away from the guide portion 22 regardless of the posture thereof on the guide portion 22, the entire guide band 42 is laminated on the upper surface of the sheet covering 41.

Next, an operation of the second embodiment will be described.

Figure 13A:
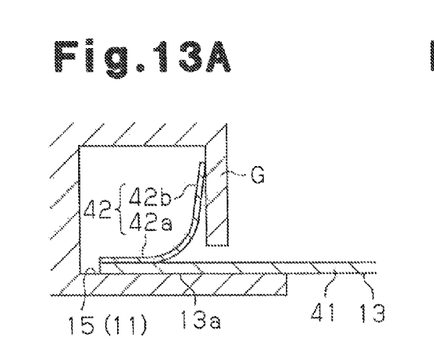
FIGS. 13(a) to 13(c) are explanatory views illustrating operations.
Figure 13B:
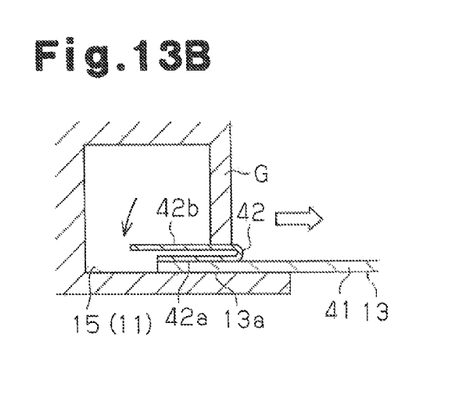

It is assumed that the load in the direction in which the shading sheet 13 comes off the guide rail 11 is applied to the shading sheet 13 due to external force such as the vehicle vibration and force of an operator regardless of the operation/non-operation of the shading sheet 13. In this case, as shown in FIGS. 13(a) and 13(b), if a substantially flange shaped guide portion G with high rigidity protrudes from the guide rail 11 instead of the guide portion 22, only the guide band 42 (sliding portion 42b) is basically elastically deformed. Accordingly, the guide band 42 is elastically deformed such that it is folded at a boundary portion between the edge portion 42a and the sliding portion 42b. This facilitates the guide band 42 to come off the guide passage 15 (guide rail 11). Accordingly, it is necessary to increase the rigidity of the guide band 42 to restrict the guide band 42 from coming off the guide passage 15. Therefore, it becomes difficult to elastically deform the shading sheet 13 (guide band 42) when, rolling up the shading sheet 13.

Figure 13C:
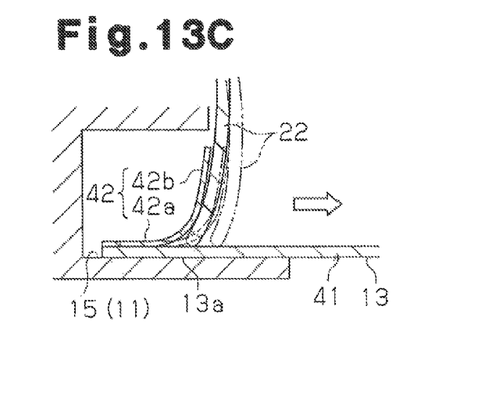

In contrast, as shown in FIG. 13(c), in the case of the guide portion 22 with low rigidity, the guide portion 22 and the guide band 42 are elastically deformed to buffer the load so that the deviation from the guide passage 15 (guide rail 11) is limited. Accordingly, the rigidity required for the guide band 42 is reduced. This facilitate the elastic deformation of the shading sheet 13 (guide band 42) when rolling up the shading sheet 13. In particular, the direction in which the guide portion 22 is deformed at this time corresponds to a direction in which the lower end of the guide portion 22 moves downward, namely the direction in which a margin of deviation of the shading sheet 13 is reduced. Accordingly, the deviation from the guide passage 15 (guide rail 11) is further limited.

The above described second embodiment has the following advantages.

(1) In the second embodiment, the rigidity required for the guide band 42 is reduced. This facilitate the elastic deformation of the shading sheet 13 (guide band 42) when rolling up the shading sheet 13, for example. As the elastic deformation of the shading sheet 13 (guide band 42) when rolling up the shading sheet 13 is facilitated, the load when rolling up the shading sheet 13 is reduced and the laxation of the shading sheet 13 is limited so that an outer diameter of the shading sheet 13 when the shading sheet 13 has been rolled up is reduced as well. Accordingly, useless space generated in the accommodation space of the shading sheet 13 is reduced.

In addition, as for the edge portion 13a (guide band 42) of the shading sheet 13 in the lateral direction, it is not necessary to ensure a sufficient thickness of the guide rail 11 to restrict the shading sheet 13 from coming off the guide rail 11 so that the outer diameter of the shading sheet 13 when the shading sheet 13 has been rolled up is further reduced.

As described above, the space in the passenger compartment required for the sunshade device 10 is minimized.

Further, when operating the shading sheet 13, namely when rolling up or rolling out the shading sheet 13, even if the load in the direction in which the shading sheet 13 comes off the guide rail 11 is applied to the shading sheet 13, the guide portion 22 with low rigidity and the guide band 42 are elastically deformed so that the contact between the guide portion 22 and the guide band 42 is maintained as surface contact. This reduces the likelihood that the friction force of the guide band 42 when sliding is concentrated on a part so that the operation failure of the shading sheet 13 is caused.

(2) In the second embodiment, as for the guide band 42, the joining portion 42c moves on the guide rail 11 from the rear end of the guide portion 22 with the end portion (vertical wall portion 14a) of the frame 14 according to the rolling out of the shading sheet 13. Accordingly, the guide band 42 is guided such that the guide band 42 and the sheet covering 41 lie on the opposite sides of the guide portion 22. Accordingly, it is assumed that the edge portion 13a (guide band 42) of the shading sheet 13 in the lateral direction comes off the guide rail 11 due to the load in the direction in which the shading sheet 13 comes off the guide rail 11. In this case, if the shading sheet 13 is rolled up until the end portion of the frame 14 passes away from the rear end of the guide portion 22, and the shading sheet 13 is rolled out until the end portion of the frame 14 reaches the rear end of the guide portion 22 again, the end portion 13a of the shading sheet 13 returns to its original state where the sheet covering 41 and the guide band 42 lie on the opposite sides of the guide portion 22, namely a normally retained state.

In particular, in the state where the shading sheet 13 is rolled up so that the light passing through the roof panel 3 is the most, if the end portion of the frame 14 is set such that it is ensured to come off the rear end of the guide portion 22, the shading sheet 13 is returned to the normally retained state by rolling out the shading sheet 13 after rolling up the shading sheet 13 without taking the guide portion 22 into consideration.

Accordingly, excessive force is unlikely to be applied to the guide rail 11, the sheet covering 41, and the guide band 42 when returning to the normally retained state.

(3) In the second embodiment, the guide portion 22 is laminated on the guide band 42 without being laminated on the sheet covering 41 to slide on and guide the guide band 42. Accordingly, when slidably installing the edge portion 13a of the shading sheet 13 in the lateral direction on the guide rail 11, only the guide band 42 may be laminated on the guide portion 22. Accordingly, the installation performance of the sunshade device 10 is improved.

(4) In the second embodiment, the sheet covering 41 and the guide band 42 are formed of a cloth material so that the properties of the thermal expansion and shrinkage of the sheet covering 41 and the guide band 42 are substantially the same with each other. Accordingly, generation of creases on the sheet covering 41 due to the effect of the environmental conditions such as heat and humidity is limited.

Further, the guide band 42 of the cloth material is easily joined by sewing or adhesion because the guide band 42 has tensile force proximate that of the sheet covering 41. Accordingly, the productivity of the shading sheet 13 is excellent.

(5) In the second embodiment, the guide portion 22 of the decorative member 30 extends along the guide rail 11 to shield the interior of the guide rail 11 (guide passage 15) from the interior of the passenger compartment. Accordingly, even in the state where the shading sheet 13 is rolled up so that the shading sheet 13 is substantially no longer present in the guide rail 11, the interior of the guide rail 11 is invisible so that the appearance viewed from the interior of the passenger compartment is improved.

(6) In the second embodiment, the decorative portion 31 of the decorative member 30 shields the driving portion 21 of the roof device 20, which drives the roof panel 3. Accordingly, even in the state where the roof panel 3 is opened so that the roof panel 3 is no longer present over the driving portion 21 of the roof device 20, the driving portion 21 of the roof device 20 is invisible so that the appearance viewed from the interior of the passenger compartment is improved.

(7) In the second embodiment, since the elastic deformation of the shading sheet 13 (guide band 42) when rolling up the shading sheet 13 is easy, the creases generated on the shading sheet 50 is limited so that the appearance thereof is improved.

The above described second embodiment may be modified as follows.

Figure 14:
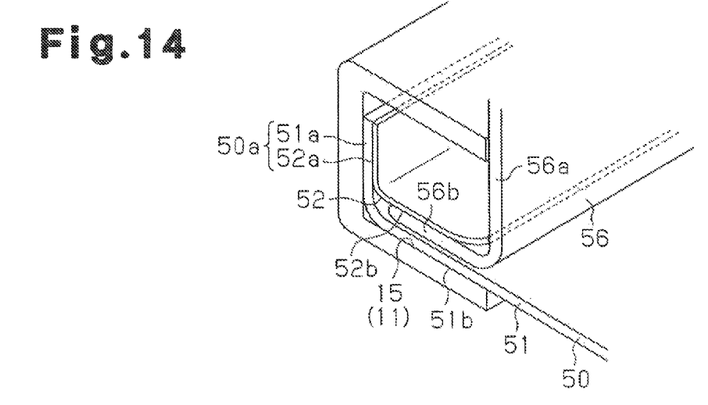
FIG. 14 is a perspective view illustrating a modified embodiment.

As shown in FIG. 14, a shading sheet 50, which forms a rising portion 50a on each of edge portions thereof in the lateral direction when sliding on the guide rail 11 (guide passage 15), may be used as a shading sheet. That is, the rising portion 50a is formed by edge portions 51a and 52a of a sheet covering 51 and a guide band 52 in the lateral direction, which are formed of a cloth material configuring the shading sheet 50. The rising portion 50a rises on the expanding surface of the sheet covering 51, namely in the moving direction of the shading sheet 50. The sheet covering 51 is supported by the upper surface of the bottom wall of the guide passage 15 on an inner edge portion 51b adjacent to the sheet covering 51 inward in the lateral direction of the vehicle. Further, the guide band 52 forms a sliding portion 52b at a part thereof inward in the lateral direction of the vehicle, which is brought into a free state.

In this case, a guide portion 56, which slides on and guides the sliding portion 52b of the guide band 52, integrally includes a first extended portion 56a, which extends downward substantially in parallel with the rising portion 50a, and a second extended portion 56b, which is continuous with the lower end of the first extended portion 56a and extends outward in the lateral direction of the vehicle toward the rising portion 50a. The rigidity of the guide portion 56 is set smaller than the rigidity of the guide rail 11. The edge portion of the shading sheet 50 in the lateral direction is brought into a state where the inner edge portion 51b of the sheet covering 51 and the sliding portion 42b of the guide band 42 lie on opposite sides of the second extended portion 56b of the guide portion 56 in the interior of the guide passage 15 (guide rail 11). In this state, as for the edge portion of the shading sheet 50 in the lateral direction, the edge portion 51a and the inner edge portion 51b of the sheet covering 51 are allowed to slide on the guide passage 15 and guided by the guide portion 22 on the guide band 42 (sliding portion 42b) during the sliding. The guide portion 56 (second extended portion 56b) slides on and guides the guide band 52 in the state where the lower end thereof does not contact the upper surface of the sheet covering 51 (inner edge portion 51b). However, the lower surface of the guide portion 56 (second extended portion 56b) may contact the upper surface of the sheet covering 51 (inner edge portion 51b).

As described above, the shading sheet 50 forms the rising portion 50a on each of the edge portions thereof in the lateral direction when the shading sheet 50 slides on the guide rail 11 (guide passage 15). Accordingly, flexural rigidity of the edge portion of the shading sheet 50 in the lateral direction in the moving direction is increased in addition to the advantages similar to those of (1) and (3) to (7) of the second embodiment. Thereby, for example, when rolling up the shading sheet 50, the operation input is smoothly transmitted to the entire shading sheet 50. The generation of delay of the rolling up of a part of the shading sheet 50 is limited and the creases generated in the early operation stage is limited as well so that the appearance is improved.

It is assumed that the load in the direction in which the shading sheet 50 comes off the guide rail 11 is applied to the shading sheet 50 due to external force such as the vehicle vibration and force of an operator regardless of the operation/non-operation of the shading sheet 50. In this case, when the guide portion 56 and the guide band 52 are elastically deformed so that the load is buffered, the guide portion 56 approaches the upper surface of the sheet covering 51 (inner edge portion 51b) so that the deviation from the guide passage 15 (guide rail 11) is further limited.

In the state where the shading sheet 50 has been rolled up, the entire guide band 52 including the sliding portion 52b is laminated on the upper surface of the sheet covering 51 so that the entire guide band 52 is rolled up integrally with the sheet covering 51 in the state where the rising portion 50a (edge portions 51a and 52a) lies down. That is, even in this case, the edge portion of the shading sheet 50 is rolled up with a thickness including the thicknesses of the sheet covering 51 and the guide band 52.

The rising portion 50a of the shading sheet 50 may be formed by any one of the sheet covering 51 and the guide band 52.

Figure 15A:
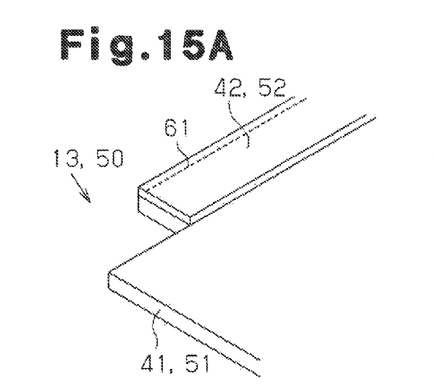
FIGS. 15(a) to 15(c) are explanatory views illustrating a jointed form between a sheet covering and guide bands.
Figure 15B:
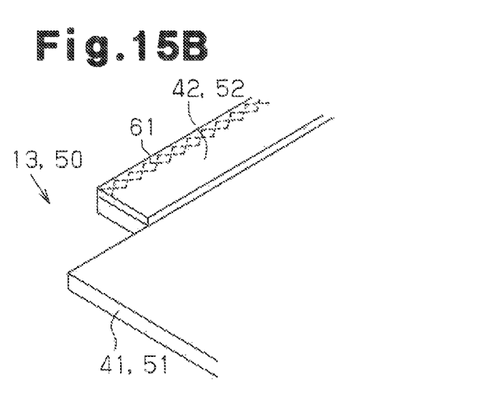

In connecting the sheet coverings 41 and 51 with the guide bands 42 and 52, as shown in FIG. 15(a), sewing by a single thread 61 may be adopted. Alternatively, as shown in FIG. 15(b), a cross stitch by threads 61 may be adopted. In this case, in particular, the rigidity of the shading sheets 13 and 50 in the longitudinal direction, namely in the moving direction of the shading sheet 50 is adjusted by adjusting the form of the cross, for example.

Figure 15C:
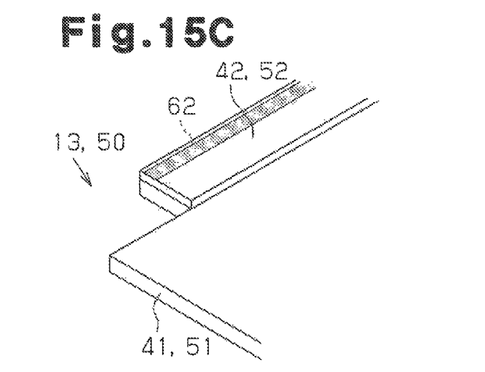

Alternatively, as shown in FIG. 15(c), a joint by an adhesive 62 may be adopted. In this case, if the sheet coverings 41 and 51 have a laminated, structure formed of outer and back cloth materials, the guide bands 42 and 52 may be joined simultaneously with the sheet coverings 41 and 51 when laminating process of the surface and the rear face cloth materials is performed.

In the above described second embodiment, it is possible to omit the joining portion 42c with the end portion (vertical wall portion 14a) of the frame 14, which moves on the guide rail 11 from the rear end of the guide portion 22 to guide the guide band 42 such that the joining portion 42c and the sheet covering 41 lie on the opposite sides of the guide portion 22. In this case, the shading sheet 13 may be connected to the frame 14 only by the sheet covering 41.

In the above described second embodiment, the lower end of the guide portion 22 may contact the upper surface of the sheet covering 41. For example, the guide portion 22 may be laminated on the upper surface of the sheet covering 41. Similarly, the lower surface of the guide portion 56 (second extended portion 56b) may contact the upper surface of the sheet covering 51 (inner edge portion 51b) so that it is laminated, on the upper surface of the sheet covering 41.

In the above described second embodiment, the materials of the sheet coverings 41 and 51 and the guide bands 42 and 52 may be different from each other. For example, the guide bands 42 and 52 may be metal thin plates. In this case, the guide rail is preferably made of plastic material to avoid noise when sliding. The guide bands 42 and 52 may be plastic thin plates.

In the above described second embodiment, the guide portion 22 (decorative member 30) provided separate from the guide rail 11 is fixed to the guide rail 11 (mounting recess 18). In contrast, the guide portion may be formed integrally with the guide rail 11 through the outsert molding, for example. Alternatively, in the case where the plastic guide rail is adopted, the guide portion may be formed integrally with the guide rail according to the two-color molding. In the case where the guide rail and the guide portion are molded by the same material, the thickness of the guide portion may be adjusted so that the rigidity of the guide portion may be smaller than the rigidity of the guide rail. In these cases, the mounting recess 18 of the guide rail 11 and a surrounding structure thereof (parts such as the mounting portion 33) may be omitted.

In the above described second embodiment, if the guide portions 22 and 56 include low rigidity, they may be molded by a material with low sliding resistance. In the guide portions 22 and 56, only the surfaces thereof, which slide on the guide bands 42 and 52, may be formed of a material with low sliding resistance, namely by the two-color molding.

In the above described second embodiment, the decorative portion 31, which shields the driving portion 21 of the roof device 20, is provided in the decorative member 30. A configuration in which the decorative portion 31 is omitted may be adopted. In particular, if the roof panel 3 is of a stationary type, the driving portion 21 is absent. Accordingly, even if the decorative portion 31 is not provided, the appearance is not degraded.

In the above described second embodiment, the frame 14 may be configured by a frame body, which extends in the lateral direction of the vehicle such that it bridges between the guide rails 11, and a pair of sliding members respectively connected to the end portions of the frame body, which slide on the guide rails 11. In this case, the joining portion 42c of the guide band 42 may be connected to any of the frame body and the sliding members.

In the above described second embodiment, the shape of the frame 14 may be changed to a shape other than the substantially cuboid shape. For example, an operation portion (handle) may be provided for manually operating the shading sheets 13 and 50.

In the above described second embodiment, the operation of the shading sheet 13 may be electrically performed by an appropriate actuator.

In the above described second embodiment, the sunshade device 10, which shades a part corresponding to the roof opening 2, is applied. The sunshade device 10, which shades a part other than the part corresponding to the roof opening 2, for example, window glass, may be applied.

In the above described second embodiment, the phrase "shading sheet" ("sheet covering") includes not only a shading sheet that shades 100% of the light, but also a shading sheet that changes transmittance of the light.

The invention claimed is:

1. A sunshade device comprising:
a shading sheet adapted to shade light incident through an opening formed in a vehicle to an interior of a passenger compartment and permit passage of the light;
a pair of guide rails including guide passages, wherein the guide passages slidably support opposite end portions of the shading sheet in a lateral direction; and
shielding members each provided in one of the guide rails, wherein each shielding member extends in a longitudinal direction of the corresponding guide rail and shields the guide passage from the interior of the passenger compartment,
wherein
an opening of an interior member is formed at a position corresponding to the opening of the vehicle,
each shielding member is adapted to operate with one of the corresponding guide rail and an opening end of the interior member to contact the corresponding end portion of the shading sheet in the lateral direction so that the shielding member presses the end portion of the shading sheet,
each shielding member is adapted to contact one of the corresponding guide rail and the opening end of the interior member at a part of the guide rail in which the end portion of the shading sheet in the lateral direction is absent when the shading sheet is opened,
the guide rails are adapted to shield a driving portion of a driving device, which moves a movable panel for opening and closing the opening, from the interior of the passenger compartment, and
each guide rail includes a decorative member, which extends in the longitudinal direction of the guide rail and is formed integrally with the corresponding shielding member.

2. A sunshade device comprising:
a shading sheet adapted to shade light incident through an opening formed in a vehicle to an interior of a passenger compartment and permit passage of the light;
a pair of guide rails including guide passages, wherein the guide passages slidably support opposite end portions of the shading sheet in a lateral direction; and
shielding members each provided in one of the guide rails, wherein each shielding member extends in a longitudinal direction of the corresponding guide rail and shields the guide passage from the interior of the passenger compartment, wherein
an opening of an interior member is formed at a position corresponding to the opening of the vehicle,
each shielding member is adapted to operate with one of the corresponding guide rail and an opening end of the interior member to contact the corresponding end portion of the shading sheet in the lateral direction so that the shielding member presses the end portion of the shading sheet,
the guide rails are adapted to shield a driving portion of a driving device, which moves a movable panel for opening and closing the opening of the vehicle, from the interior of the passenger compartment, and
each guide rail includes a decorative member, which extends in the longitudinal direction of the guide rail and is formed integrally with the corresponding shielding member.

3. The sunshade device according to claim 2, wherein a distal end of each shielding member is located inside the corresponding guide passage.

4. The sunshade device according to claim 2, wherein a contact portion of each shielding member, which contacts the shading sheet, is formed of a material with low sliding resistance.

5. The sunshade device according to claim 2, wherein a contact portion of each shielding member, which contacts the shading sheet, is shaped as a protrusion in a cross-sectional view in a direction perpendicular to the longitudinal direction of each guide rail.

6. The sunshade device according to claim 2, further comprising support portions provided in one of the shielding members, wherein each support portion contacts the corresponding guide rail to limit displacement of the contact portion in contact with each end portion of the shading sheet in the lateral direction.

7. The sunshade device according to claim 2, wherein
the shading sheet moves in a direction along the guide rails and is rolled up to permit the passage of the light, and moves in a reverse direction and is rolled out to shade the light,
the shading sheet includes a sheet covering, which expands according to the rolling out of the shading sheet to shade light, and a pair of guide bands respectively connected to opposite edges of the sheet covering in the lateral direction, each shielding member serves as a guide portion, which guides one of the guide bands along the guide rails, and has a rigidity smaller than the rigidity of the guide rails, and the guide portion is warped to be located inside the corresponding guide passage such that the sheet covering and the corresponding guide band lie on opposite sides of the guide portion so that the guide portion slides on and guides the guide band.

8. The sunshade device according to claim 7, wherein the shading sheet further includes a frame, which is connected to a leading end of the shading sheet when rolling out the shading sheet, the frame includes a pair of end portions respectively slidably supported by the guide passages, and each guide band includes a connecting portion connected to the corresponding end portion of the frame, the end portion of the frame moves on the corresponding guide rail from a distal end of the guide portion in a direction in which the shading sheet is rolled up so that the connecting portion guides the guide band such that the sheet covering and the guide band lie on the opposite sides of the guide portion.

9. The sunshade device according to claim 7, wherein an edge portion of at least one of the sheet covering and each guide band forms a rising portion, which rises with respect to the moving direction of the shading sheet when sliding on the guide rails.

* * * * *